US011667746B2

(12) United States Patent
Thiebes et al.

(10) Patent No.: US 11,667,746 B2
(45) Date of Patent: Jun. 6, 2023

(54) MOISTURE-CURING COMPOSITIONS

(71) Applicant: Covestro Deutschland AG, Leverkusen (DE)

(72) Inventors: Christoph Thiebes, Cologne (DE); Florian Stempele, Cologne (DE); Ute Nattke, Leverkusen (DE)

(73) Assignee: Covestro Deutschland AG, Leverkusen (DE)

( * ) Notice: Subject to any disclaimer, the term of this patent is extended or adjusted under 35 U.S.C. 154(b) by 382 days.

(21) Appl. No.: 16/957,048

(22) PCT Filed: Dec. 12, 2018

(86) PCT No.: PCT/EP2018/084559
§ 371 (c)(1),
(2) Date: Jun. 22, 2020

(87) PCT Pub. No.: WO2019/121239
PCT Pub. Date: Jun. 27, 2019

(65) Prior Publication Data
US 2020/0392275 A1 Dec. 17, 2020

(30) Foreign Application Priority Data
Dec. 22, 2017 (EP) .................................... 17209986

(51) Int. Cl.
C08G 18/77 (2006.01)
C08G 18/24 (2006.01)
C08G 18/28 (2006.01)
C08G 18/48 (2006.01)

(52) U.S. Cl.
CPC ......... *C08G 18/242* (2013.01); *C08G 18/289* (2013.01); *C08G 18/4825* (2013.01); *C08G 18/778* (2013.01); *C08G 2150/00* (2013.01); *C08G 2170/00* (2013.01); *C08G 2190/00* (2013.01)

(58) Field of Classification Search
CPC .. C08G 18/06; C08G 18/4825; C08G 18/778; C08G 18/289; B01J 2531/42
See application file for complete search history.

(56) References Cited

U.S. PATENT DOCUMENTS

| 3,971,751 A | 7/1976 | Isayama et al. |
| 6,207,766 B1 | 3/2001 | Doi et al. |
| 2007/0129528 A1* | 6/2007 | Huang .................... C08L 75/04 528/78 |
| 2012/0220717 A1* | 8/2012 | Richter .................. C08G 18/24 528/53 |

FOREIGN PATENT DOCUMENTS

| DE | 102009051445 A1 | 5/2011 |
| DE | 102009057598 A1 | 6/2011 |
| WO | 2014/048854 A1 | 4/2014 |

OTHER PUBLICATIONS

Chernov et al., "Heteroleptic tin (II) dialkoxides stabilized by intramolecular coordination Sn(OCH2CH2NMe2)(OR) (R=Me, Et, iPr, tBu, Ph). Synthesis, structure and catalytic activity in polyurethane synthesis", J. Organomet. Chem., vol. 694, 2009, pp. 3184-3189.
Mehrotra et al., "Ethanolamine Derivatives of Sn(IV)", Indian J. Chem., vol. 5, 1967, pp. 643-645.
Selina et al., "Metallocanes of group 14 elements 2. Derivatives of tin (Review)," Chem. Heterocycl. Comp., vol. 43, 2007, pp. 813-834.
International Preliminary Report on Patentability received for PCT Patent Application No. PCT/EP2018/084559, dated Jul. 2, 2020, 16 pages (10 pages of English Translation and 6 pages of Original Document).
International Search Report and Written Opinion received for PCT Patent Application No. PCT/EP2018/084559, dated Feb. 21, 2019, 18 pages (9 pages of English Translation and 9 pages of Original Document).

* cited by examiner

*Primary Examiner* — Kuo Liang Peng
(74) *Attorney, Agent, or Firm* — The Webb Law Firm

(57) ABSTRACT

The invention relates to a method for preparing polyurethanes containing alkoxysilane groups, said method comprising the step of reacting a compound containing at least one NCO group with a compound containing at least one Zerewitinoff-active H atom in the presence of a catalyst component, the at least one compound containing an NCO group and/or the compound containing at least one Zerewitinoff-active H atom containing at least one alkoxysilane group, so as to obtain a polyurethane containing alkoxysilane groups. The invention also relates to a polymer containing alkoxysilane groups, a method for preparing a curable polymer, a curable polymer, a cured polymer, and use thereof. The polyurethanes are prepared with use of a thermally labile tin catalyst.

13 Claims, No Drawings

MOISTURE-CURING COMPOSITIONS

CROSS-REFERENCE TO RELATED APPLICATIONS

This application is a national stage application (under 35 U.S.C. § 371) of PCT/EP2018/084559, filed Dec. 12, 2018, which claims benefit of European Application No. 17209986.3, filed Dec. 22, 2017, both of which are incorporated herein by reference in their entirety.

The present invention relates to a process for producing alkoxysilane-containing polyurethanes, comprising the step of reacting a compound containing at least one NCO group with a compound containing at least one Zerewitinoff-active H atom in the presence of a catalyst component, wherein the compound containing at least one NCO group and/or the compound containing at least one Zerewitinoff-active H atom contain at least one alkoxysilane group, to afford an alkoxysilane-containing polyurethane. The invention further relates to an alkoxysilane-containing polymer, to a process for producing a curable polymer, to a curable polymer, to a cured polymer and to the use thereof.

Moisture-curable compositions based on silane-functional polymers are known and are employed in large amounts for example in construction as elastic sealants or elastic parquet flooring adhesives.

Silane-functional polymers may be divided into three different classes which differ in terms of their silane group reactivity, this being reflected in the curing rate of the moisture-curable compositions produced therefrom.

Polymers produced by hydrosilylation of polymers having terminal double bonds, for example poly(meth)acrylate polymers or polyether polymers, are known. They are described for example in U.S. Pat. Nos. 3,971,751 and 6,207,766. These have the disadvantage of low reactivity and the production of moisture-curable compositions having practicable curing times thus in many cases requires addition of tin-containing curing catalysts for production which are toxicologically concerning and suffer from ever decreasing market acceptance.

Polymers in which so-called gamma-silane groups are bonded to the polymer backbone via urethane or urea groups are markedly more reactive and production of moisture-curable compositions with practicable curing times is in many cases possible with only small amounts, if any, of tin-containing catalysts.

The third class is that of polymers in which so-called alpha-silane groups are bonded to the polymer backbone via urethane or urea groups and which in some cases cure rapidly even without specific curing catalysts. The disadvantage of these classes is that on account of their high reactivity they are unstable and costly and have poor availability.

DE 10 2009 051445 A1 discloses polyisocyanate polyaddition products obtainable from
a) at least one aliphatic, cycloaliphatic, araliphatic and/or aromatic polyisocyanate
b) at least one NCO-reactive compound
c) at least one thermolatent inorganic tin-containing catalyst
d) optionally further catalysts distinct from c) and/or activators
e) optionally fillers, pigments, additives, thickeners, defoamers and/or other auxiliary and additive substances,
wherein the ratio of the weight of the tin from component c) and of the weight of component a) is less than 3000 ppm when component a) is an aliphatic polyisocyanate and is less than 95 ppm when component a) is an aromatic polyisocyanate and wherein as thermolatent catalysts the following cyclic tin compounds are employed:

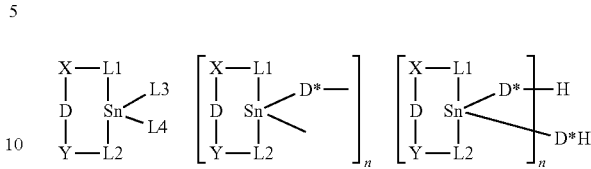

The production of commercial silane-terminated polyurethane prepolymers involves catalysis of the reaction of NCO groups with Zerewitinoff-active H atoms. DBTL is usually used for this. However, due to the toxicological properties of DBTL, there is a need for alternative catalysts.

DBTL is also used to manufacture curable compositions based on silane-functional polymers. Here too, there is a need for alternative catalysts on account of the toxicological properties of DBTL.

The present invention has for its object to provide a more toxicologically advantageous process for producing silane-containing polyurethanes which does not have a negative effect on the viscosity, stability and color of the product and wherein the product is rapidly curable by addition of non-organotin catalysts.

This object is achieved according to the invention by a process as claimed in claim 1, an alkoxysilane-containing polyurethane as claimed in claim 7, a process for producing a curable polymer as claimed in claim 9, a curable polymer as claimed in claim 11, a cured polymer as claimed in claim 12 and a use as claimed in claim 14. Advantageous developments are specified in the subsidiary claims and the description. They may be combined as desired unless the opposite is clear from the context.

A process for producing alkoxysilane-containing polyurethanes, comprises the step of reacting a compound containing at least one NCO group with a compound containing at least one Zerewitinoff-active H atom in the presence of a catalyst component, wherein the compound containing at least one NCO group and/or the compound containing at least one Zerewitinoff-active H atom contain at least one alkoxysilane group, to afford an alkoxysilane-containing polyurethane.

The reaction is at least periodically performed at a temperature of ≥50° C. and the catalyst component comprises one or more cyclic tin compounds selected from the group of mono- or polycyclic tin compounds of the type:
1,1-di-"R"-5-"organyl"-5-aza-2,8-dioxa-1-stannacyclooctanes,
1,1-di-"R"-5-(N-"organyl")aza-3,7-di-"organyl"-2,8-dioxa-1-stannacyclooctanes,
1,1-di-"R"-5-(N-"organyl")aza-3,3,7,7-tetra-"organyl"-2,8-dioxa-1-stannacyclooctanes,
4,12-di-"organyl"-1,7,9,15-tetraoxa-4,12-diaza-8-stannaspiro[7.7]pentadecanes,
4,12-di-"organyl"-2,6,10,14-tetra-"organyl"-1,7,9,15-tetraoxa-4,12-diaza-8-stannaspiro[7.7]pentadecanes,
4,12-di-"organyl"-2,2,6,6,10,10,14,14-octa-"organyl"-1,7,9,15-tetraoxa-4,12-diaza-8-stannaspiro[7.7]pentadecanes
wherein "R" represents D*, L3 or L4 and "organyl" represents R1 as defined below:
R1 represents a saturated or unsaturated, linear or branched, aliphatic or cycloaliphatic radical or an optionally substituted aromatic or araliphatic radical which has up to 20 carbon atoms and may optionally contain heteroatoms from the group of oxygen, sulfur and nitrogen, or represents hydrogen or the radical

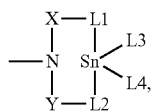

or R1 and L3 together represent -Z-L5-;

D* represents —O— or —S—;

X, Y and Z represent identical or different radicals selected from alkylene radicals of formulae —C(R2)(R3)—, —C(R2)(R3)—C(R4)(R5)— or —C(R2)(R3)—C(R4)(R5)—C(R6)(R7)— or ortho-arylene radicals of formulae

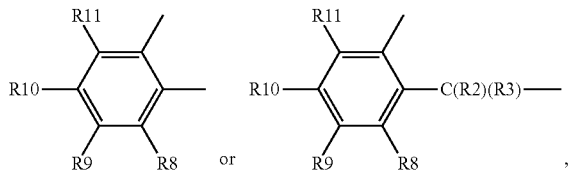

wherein R2 to R11 independently of one another represent saturated or unsaturated, linear or branched, aliphatic or cycloaliphatic or optionally substituted aromatic or araliphatic radicals which have up to 20 carbon atoms and may optionally contain heteroatoms from the group of oxygen, sulfur and nitrogen, or represent hydrogen;

L1, L2 and L5 independently of one another represent —O—, —S—, —OC(=O)—, —OC(=S)—, —SC(=O)—, —SC(=S)—, —OS(=O)$_2$O—, —OS(=O)$_2$— or —N(R12)—, wherein R12 represents a saturated or unsaturated, linear or branched, aliphatic or cycloaliphatic radical or an optionally substituted aromatic or araliphatic radical which has up to 20 carbon atoms and may optionally contain heteroatoms from the group of oxygen, sulfur and nitrogen, or represents hydrogen;

L3 and L4 independently of one another represent —OH, —SH, —OR13, —Hal, —OC(=O)R14, —SR15, —OC(=S)R16, —OS(=O)$_2$OR17, —OS(=O)$_2$R18 or —NR19R20, or L3 and L4 together represent -L1-X-D-Y-L2- (D represents —O—, —S— or —N(R1)—), wherein R13 to R20 independently of one another represent saturated or unsaturated, linear or branched, aliphatic or cycloaliphatic or optionally substituted aromatic or araliphatic radicals which have up to 20 carbon atoms and may optionally contain heteroatoms from the group of oxygen, sulfu and nitrogen, or represent hydrogen.

The tin compounds to be employed according to the invention are thermally labile. Below a certain temperature, they do not exhibit industrially useful catalytic activity for the reaction of NCO groups with functional groups bearing Zerewitinoff-active hydrogen atoms. The reactions in question here are especially urethanizations and urea formations. However, the catalytic activity increases markedly above a certain temperature. Without wishing to be bound to a particular theory it is thought that the ligands then dissociate from the Sn center completely or partially, thus making the Sn center available as a catalyst. The catalysts may therefore be referred to as thermally latent catalysts. Activation of the Sn catalyst is preferably achieved by heating to a temperature of ≥50° C., preferably ≥65° C., more preferably ≥80° C., particularly preferably ≥80° C. to ≤200° C., so that once reaction of the NCO groups has been effected the article is obtained. The heating may be effected for a period of ≥1 minute, preferably ≥5 minutes, more preferably ≥10 minutes to ≤24 hours, preferably ≤8 hours, particularly preferably <4 hours.

The catalytic activity of the thermolatent catalyst for the process according to the invention is preferably configured such that the yet to be heated reaction mixture has a pot life (defined as the time over which the viscosity of the material doubles) at 23° C. of >1 h, preferably >2 h, particularly preferably >4 h and very particularly preferably >6 h.

In the cases in which the tin compounds comprise ligands with free OH radicals and or NH radicals the catalyst can be incorporated into the product in the polyisocyanate polyaddition reaction. A particular advantage of these incorporable catalysts is their markedly reduced fogging behavior.

The different methods of preparation for the tin(IV) compounds for use in accordance with the invention or their tin(II) precursors are described inter alia in: *J. Organomet. Chem.* 2009 694 3184-3189, *Chem. Heterocycl. Comp.* 2007 43 813-834, *Indian J. Chem.* 1967 5 643-645 and in literature cited therein.

The content of the abovementioned tin compounds in the reaction mixture may be made dependent on the type of the employed isocyanates. Thus when NCO groups bonded to an aromatic carbon atom dominate the content may be ≤100 ppm based on the total weight of the reaction mixture. When NCO groups bonded to an aliphatic carbon atom dominate the content is ≤3000 ppm based on the total weight of the reaction mixture.

A preferred embodiment provides that in the definition according to the foregoing, R1 represents hydrogen or a methyl, ethyl, propyl, butyl, hexyl, octyl, Ph, or CH$_3$Ph radical or the radical

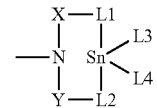

and propyl, butyl, hexyl and octyl represent all isomeric propyl, butyl, hexyl and octyl radicals.

A further preferred embodiment provides that in the definition according to the foregoing, D* is —O—.

Further preferred features for the tin compounds according to the foregoing are as follows:

X, Y and Z are preferably the alkylene radicals —C(R2)(R3)— or —C(R2)(R3)—C(R4)(R5)— or the ortho-arylene radical

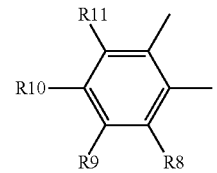

R2 to R7 are preferably hydrogen or alkyl, aralkyl, alkaryl or aryl radicals having up to 20 carbon atoms, particularly preferably hydrogen or alkyl, aralkyl, alkaryl or aryl radicals having up to 8 carbon atoms, very particularly preferably hydrogen or alkyl radicals having up to 8 carbon atoms, even further preferably hydrogen or methyl.

R8 to R11 are preferably hydrogen or arlkyl radicals having up to 8 carbon atoms, particularly preferably hydrogen or methyl.

L1, L2 and LS are preferably —NR12—, —S—, —SC(=S)—, —SC(=O)—, —OC(=S)—, —O—, or —OC(=O)—, particularly preferably —O—, or —OC(=O)—.

R12 is preferably hydrogen or an alkyl, aralkyl, alkaryl or aryl radical having up to 20 carbon atoms, particularly preferably hydrogen or an alkyl, aralkyl, alkaryl or aryl radical having up to 12 carbon atoms, very particularly preferably hydrogen or a methyl, ethyl, propyl, butyl, hexyl or octyl radical, wherein propyl, butyl, hexyl and octyl represent all isomeric propyl, butyl, hexyl and octyl radicals.

L3 and L4 are preferably —Hal, —OH, —SH, —OR13, —OC(=O)R14, wherein the R13 and R14 radicals have up to 20 carbon atoms, preferably up to 12 carbon atoms.

L3 and L4 are particularly preferably Cl—, MeO—, EtO—, PrO—, BuO—, HexO—, OctO—, PhO—, formate, acetate, propanoate, butanoate, pentanoate, hexanoate, octanoate, laurate, lactate or benzoate, wherein Pr, Bu, Hex and Oct represent all isomeric propyl, butyl, hexyl and octyl radicals, yet more preferably Cl—, MeO—, EtO—, PrO—, BuO—, HexO—, OctO—, PhO—, hexanoate, laurate or benzoate, wherein Pr, Bu, Hex and Oct represent all isomeric propyl, butyl, hexyl and octyl radicals.

R15 to R20 are preferably hydrogen or alkyl, aralkyl, alkaryl or aryl radicals having up to 20 carbon atoms, particularly preferably hydrogen or alkyl, aralkyl, alkaryl or aryl radicals having up to 12 carbon atoms, very particularly preferably hydrogen, methyl, ethyl, propyl, butyl, hexyl or octyl radicals, wherein propyl, butyl, hexyl and octyl represent all isomeric propyl, butyl, hexyl and octyl radicals.

The units L1-X, L2-Y and L5-Z preferably represent —CH$_2$CH$_2$O—, —CH$_2$CH(Me)O—, CH(Me)CH$_2$O—, CH$_2$C(Me)$_2$O—, —C(Me)$_2$CH$_2$O— or —CH$_2$C(=O)O—.

The L1-X-D-Y-L2 unit preferably represents: HN[CH$_2$CH$_2$O—]$_2$, HN[CH$_2$CH(Me)O—]$_2$, HN[CH$_2$CH(Me)O—][CH(Me)CH$_2$O—], HN[CH$_2$C(Me)$_2$O—]$_2$, HN[CH$_2$C(Me)$_2$O—][C(Me)$_2$CH$_2$—], HN[CH$_2$C(=O)O—]$_2$, MeN[CH$_2$CH$_2$O—]$_2$, MeN[CH$_2$CH(Me)O—]$_2$, MeN[CH$_2$CH(Me)O—][CH(Me)CH$_2$O—], MeN[CH$_2$C(Me)$_2$O—]$_2$, MeN[CH$_2$C(Me)$_2$O—][C(Me)$_2$CH$_2$O—], MeN[CH$_2$C(=O)O—]$_2$, EtN[CH$_2$CH$_2$O—]$_2$, EtN[CH$_2$CH(Me)O—]$_2$, EtN[CH$_2$CH(Me)O—][CH(Me)CH$_2$O—], EtN[CH$_2$C(Me)$_2$O—]$_2$, EtN[CH$_2$C(Me)$_2$O—][C(Me)$_2$CH$_2$O—], EtN[CH$_2$C(=O)O—]$_2$, PrN[CH$_2$CH$_2$O—]$_2$, PrN[CH$_2$CH(Me)O—]$_2$, PrN[CH$_2$CH(Me)O—][CH(Me)CH$_2$O—], PrN[CH$_2$C(Me)$_2$O—]$_2$, PrN[CH$_2$C(Me)$_2$O—][C(Me)$_2$CH$_2$O—], PrN[CH$_2$C(=O)O—]$_2$, BuN[CH$_2$CH$_2$O—]$_2$, BuN[CH$_2$CH(Me)O—]$_2$, BuN[CH$_2$CH(Me)O—][CH(Me)CH$_2$O—], BuN[CH$_2$C(Me)$_2$O—]$_2$, BuN[CH$_2$C(Me)$_2$O—][C(Me)$_2$CH$_2$O—], BuN[CH$_2$C(=O)O—]$_2$, HexN[CH$_2$CH$_2$O—]$_2$, HexN[CH$_2$CH(Me)O—]$_2$, HexN[CH$_2$CH(Me)O—][CH(Me)CH$_2$O—], HexN[CH$_2$C(Me)$_2$O—]$_2$, HexN[CH$_2$C(Me)$_2$O—][C(Me)$_2$CH$_2$O—], HexN[CH$_2$C(=O)O—]$_2$, OctN[CH$_2$CH$_2$O—]$_2$, OctN[CH$_2$CH(Me)O—]$_2$, OctN[CH$_2$CH(Me)O—][CH(Me)CH$_2$O—], OctN[CH$_2$C(Me)$_2$O—]$_2$, OctN[CH$_2$C(Me)$_2$O—][C(Me)$_2$CH$_2$O—], OctN[CH$_2$C(=O)O—]$_2$, wherein Pr, Bu, Hex and Oct may represent all isomeric propyl, butyl and octyl radicals, PhN[CH$_2$CH$_2$O—]$_2$, PhN[CH$_2$CH(Me)O—]$_2$, PhN[CH$_2$CH(Me)O—][CH(Me)CH$_2$—], PhN[CH$_2$C(Me)$_2$O—]$_2$, PhN[CH$_2$C(Me)$_2$O—][C(Me)$_2$CH$_2$O—], PhN[CH$_2$C(=O)O—]$_2$,

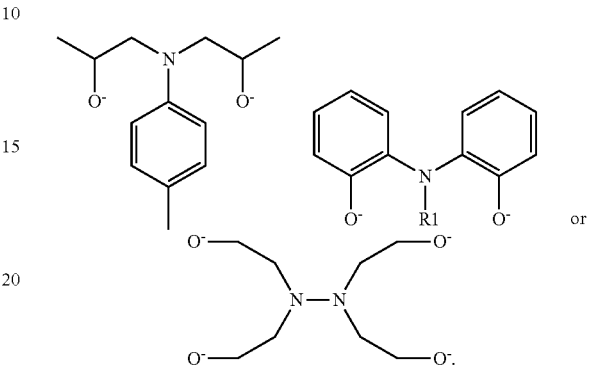

As is known to a person skilled in the art the tin compounds have a propensity for oligomerization and polynuclear tin compounds or mixtures of mono- and polynuclear tin compounds are therefore often present. In the polynuclear tin compounds the tin atoms are preferably connected to one another via oxygen atoms ('oxygen bridges', vide infra). Typical oligomeric complexes (polynuclear tin compounds) form for example through condensation of the tin atoms via oxygen or sulfur, for example

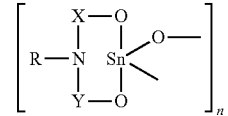

where n>1. Cyclic oligomers are often encountered in the case of low degrees of oligomerization and linear oligomers with OH or SH end groups in the case of high degrees of oligomerization. Such oligomers are included according to the invention.

This process according to the invention thus makes it possible to produce precursors for coating compositions, adhesives, elastomers and sealing compositions without having to accept the toxicological disadvantages of DBTL-based urethanization catalysts.

Acyloxysilanes are also included in the term alkoxysilanes according to the invention.

The content of the catalyst based on the total weight of the components employed in the reaction may be for example ≥0.0001% by weight to ≤1% by weight. Preferred contents are ≥0.002% by weight to ≤0.05% by weight, more preferably ≥0.005% by weight to ≤0.1% by weight.

In one embodiment of the process the reaction is at least periodically performed at a temperature of ≥50° C. (preferably ≥60° C.) for a duration of ≥1 minute (preferably for ≥50 minuten to ≤500 minutes).

In a further embodiment of the process the cyclic tin compound is selected from the group of mono- or polycyclic tin compounds of the type:

In a further embodiment of the process the cyclic tin compound employed is one or more of the following compounds:

4,12-di-n-butyl-1,7,9,15-tetraoxa-4,12-diaza-8-stannaspiro[7.7]pentadecane, 4,12-di-n-butyl-2,6,10,14-tetramethyl-1,7,9,15-tetraoxa-4,12-diaza-8-stannaspiro[7.7]pentadecane, 2,4,6,10,12,14-hexamethyl-1,7,9,15-tetraoxa-4,12-diaza-8-stannaspiro[7.7]pentadecane, 4,12-di-n-octyl-2,6,10,14-tetramethyl-1,7,9,15-tetraoxa-4,12-diaza-8-stannaspiro[7.7]pentadecane, 4,12-di-n-octyl-1,7,9,15-tetraoxa-4,12-diaza-8-stannaspiro[7.7]pentadecane, 4,12-dimethyl-1,7,9,15-tetraoxa-4,12-diaza-8-stannaspiro[7.7]pentadecane, 1,1-dichloro-5-methyl-5-aza-2,8-dioxa-1-stannacyclooctane, 1,1-diisopropyl-5-methyl-5-aza-2,8-dioxa-1-stannacyclooctane, 1,1-dibenzoyl-3,3,7,7-tetramethyl5-n-octyl-5-aza-2,8-dioxa-1-stannacyclooctane, 1,1-dibenzoyl-5-n-octyl-5-aza-2,8-dioxa-1-stannacyclooctane, 1,1-bis(p-dodecylphenylsulfonyl)-5-n-octyl-5-aza-2,8-dioxa-1-stannacyclooctane, 2-benzoyloxy-6-octyl-4,8-dioxo-1,3,6,2-dioxazastannocan-2-yl benzoate or mixtures thereof.

A very particularly preferred catalyst has the following structure:

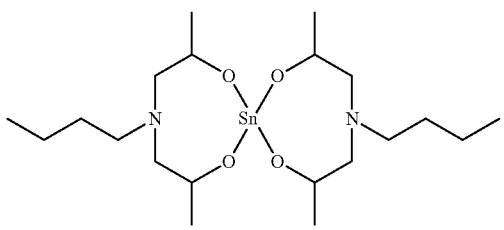 [SMILES: CCCCN1CC(C)[O][Sn]2([O]C(C)C1)[O]C(C)CN(CCCC)CC(C)[O]2]

It is also possible not to employ any protic acid in the process according to the invention.

In a further embodiment of this process the compound containing at least one NCO group contains at least one alkoxysilane group and the compound containing at least one Zerewitinoff-active H atom contains no alkoxysilane group. Suitable examples of such isocyanatoalkoxysilanes include isocyanatomethyltrimethoxysilane, isocyanatomethyltriethoxysilane, isocyanatomethyltriisopropoxysilane, 2-isocyanatoethyltrimethoxysilane, 2-isocyanatoethyltriethoxysilane, 2-isocyanatoethyltriisopropoxysilane, 3-isocyanatopropyltrimethoxysilane, 3-isocyanatopropyltriethoxysilane, 3-isocyanatopropylmethyldimethoxysilane, 3-isocyanatopropylmethyhlethoxysilane, 3-isocyanatopropylethyldiethoxysilane, 3-isocyanatopropyldimethylethoxysilane, 3-isocyanatopropyldiisopropylethoxysilane, 3-isocyanatopropyltripropoxysilane,
3-isocyanatopropyltriisopropoxysilane, 3-isocyanatopropyltributoxysilane, 3-isocyanatopropylmethyldibutoxysilane, 3-isocyanatopropylphenyldimethoxysilane, 3-isocyanatopropylphenyldiethoxysilane, 3-isocyanatopropyltris(methoxyethoxyethoxy)silane, 2-isocyanatoisopropyltrimethoxysilane, 4-isocyanatobutyltrimethoxysilane, 4-isocyanatobutyltriethoxysilane, 4-isocyanatobutyltriisopropoxysilane, 4-isocyanatobutylmethyldimethoxysilane, 4-isocyanatobutylmethyldiethoxysilane, 4-isocyanatobutylethyldimethoxysilane, 4-isocyanatobutylethyldiethoxysilane, 4-isocyanatobutyldimethylmethoxysilane, 4-isocyanatobutylphenyldimethoxysilane, 4-isocyanatobutylphenyldiethoxysilane, 4-isocyanato(3-methylbutyl)trimethoxysilane, 4-isocyanato(3-methylbutyl)triethoxysilane, 4-isocyanato(3-methylbutyl)methyldimethoxysilane, 4-isocyanato(3-methylbutyl)methyldiethoxysilane and 11-isocyanatoundecyltrimethoxysilane or any desired mixtures of such isocyanatoalkoxysilanes. Contemplated Zerewitinoff-active compounds include for example polyether polyols (in particular polypropylene glycols), polyester polyols and OH-terminated polyurethane prepolymers.

The obtained reaction product may especially have the structure (I):

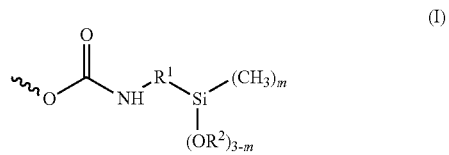

wherein

R¹ represents an alkylene radical having 1 to 6 carbon atoms,

R² represents a methyl radical or an ethyl radical and m represents 0 or 1 or 2.

It is preferable when m represents 0.

R¹ preferably represents a 1,3-propylene group and/or a methylene group (—CH₂—).

In a further embodiment of this process the compound containing at least one NCO group contains no alkoxysilane group and the compound containing at least one Zerewitinoff-active H atom contains at least one alkoxysilane group.

Suitable NCO-containing compounds include for example polyisocyanates, in particular monomeric diisocyanates such as especially 1,4-diisocyanatobutane (BDI), 1,5-diisocyanatopentane (PDI), hexamethylene 1,6-diisocyanate (HDI), 2-methyl-1,5-diisocyanatopentane, 1,5-diisocyanato-2,2-dimethylpentane, 2,2,4- or 2,4,4-trimethyl-1,6-diisocyanatohexane, 1,10-diisocyanatodecane, 1,3- and 1,4-diisocyanatocyclohexane, 1,4-diisocyanato-3,3,5-trimethylcyclohexane, 1,3-diisocyanato-2-methylcyclohexane, 1,3-diisocyanato-4-methylcyclohexane, 1-iso-3,3,5-trimethyl-5-isocyanatomethylcyclohexane (isophorone diisocyanate; IPDI), 1-isocyanato-1-methyl-4(3)-isocyanatomethylcyclohexane, 2,4'- and 4,4'-diisocyanatodicyclohexylmethane (H12MDI), 1,3- and 1,4-bis(isocyanatomethyl)cyclohexane, bis(isocyanatomethyl)norbornane (NBDI), 4,4'-diisocyanato-3,3'-dimethyldicyclohexylmethane, 4,4'-diisocyanato-3,3',5,5'-tetramethyldicyclohexylmethane, 4,4'-diisocyanato-1,1'-bi(cyclohexyl), 4,4'-diisocyanato-3,3'-dimethyl-1,1'-bi(cyclohexyl), 4,4'-diisocyanato-2,2',5,5'-tetramethyl-1,1'-bi(cyclohexyl), 1,8-diisocyanato-p-menthane, 1,3-diisocyanatoadamantane, 1,3-dimethyl-5,7-diisocyanatoadamantane, 1,3- and 1,4-bis(isocyanatomethyl)benzene (xylylene diisocyanate; XDI), 1,3- and 1,4-bis(1-isocyanato-1-methylethyl)benzene (TMXDI), bis(4-(1-isocyanato-1-methylethyl)phenyl) carbonate, 2,4- and 2,6-diisocyanatotoluene (TDI), 2,4'- and 4,4'-diisocyanatodiphenylmethane (MDI), 1,5-diisocyanatonaphthalene and mixtures thereof.

Polyisocyanates produced from diisocyanates, such as for example those having a biuret, urethane or isocyanurate structure, are also possible as NCO-containing compounds.

In a preferred embodiment the diisocyanate is selected from 1-isocyanato-3,3,5-trimethyl-5-isocyanatomethylcyclohexane (IPDI), 1,6-hexamethylene diisocyanate (HDI), 2,4- and/or 2,6-tolylene diisocyanate (TDI) or mixtures thereof.

Such a reaction product is obtainable for example from the reaction of isocyanate-containing polyethers, especially NCO-terminated urethane polyethers from the reaction of polyether polyols with a superstoichiometric amount of polyisocyanates, with aminosilanes, hydroxysilanes or mercaptosilanes. Such a silane-functional polymer especially comprises structures of formula (II)

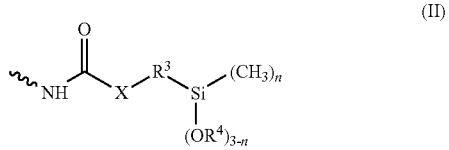

wherein

X represents O or S or $NR^5$, wherein $R^5$ represents a hydrogen atom or a hydrocarbon radical having 1 to 20 carbon atoms which optionally comprises cyclic proportions and optionally comprises an alkoxysilylgroup or one or more ether or carboxylic esters groups, $R^3$ represents a divalent hydrocarbon radical having 1 to 18 carbon atoms which optionally comprises cyclic and/or aromatic proportions and optionally comprises one or more heteroatoms, $R^4$ represents an alkyl radical having 1 to 5 carbon atoms which optionally contains an ether group and n represents 0 or 1 or 2.

It is preferable when n represents 0.

It is preferable when $R^3$ represents 1,3-propylene or 1,4-butylene or 3,3-dimethyl-1,4-butylene and X represents $NR^5$, wherein $R^5$ preferably represents a radical of formula

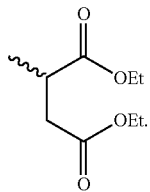

It is further preferable when X represents O and R represents a radical of formula

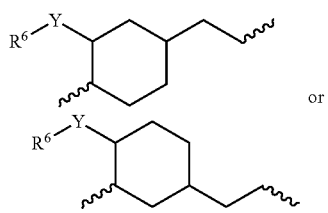

wherein this radical is configured such that X is bonded directly to the cyclohexyl ring and wherein Y represents O or $NR^7$ and $R^6$ and $R^7$ each independently of one another represent a monovalent hydrocarbon radical having 1 to 18 carbon atoms which may comprise heteroatoms in the form of ether oxygen or thioether sulfur or tertiary amine nitrogen, or together with Y (or N) form a ring, in particular a morpholine ring.

In a further embodiment of this process the compound containing at least one Zerewitinoff-active H atom contains at least one primary or secondary amino group. It is preferably N-(2-aminoethyl)-3-aminopropyltrimethoxysilane, N-cyclohexyl-3-aminopropyltrimethoxysilane, N-cyclohexylaminomethyltriethoxysilane, 3-aminopropyltriethoxysilane, 3-(2-aminomethylamino)propyltriethoxysilane, N-(2-aminoethyl)-3-aminopropylmethyldimethoxysilane, 3-aminopropyltrimethoxysilane, 3-ureidopropyltrimethoxysilane, N-(3-trimethoxysilylpropyl)aspartic acid diethyl ester or mixtures thereof. Also suitable are corresponding compounds which contain ethoxy groups instead of methoxy groups or vice versa or else contain acyloxy groups.

The invention further relates to an alkoxysilane-containing polymer, wherein the polymer comprises one or more cyclic tin compounds as described hereinabove. In terms of the tin compound the same considerations apply as above in respect of the inventive process comprising reaction of NCO groups with Zerewitinoff-active H atoms. For the sake of conciseness they are not repeated.

The alkoxysilane-containing polymer, also known as a silane-functional polymer is preferably a polyolefin, a polyester, a polyamide, a poly(meth)acrylate or a polyether or a hybrid of these polymers. The silane groups thereof may be at lateral positions in the chain or terminal. It is particularly preferable when the silane-functional polymer is a polyolefin or a polyester or a polymethacrylate or a polyether or a hybrid of these polymers.

For example the silane-functional polymer may be a silane-containing polyether. It preferably comprises a majority of oxyalkylene units, in particular 1,2-oxypropylene units. The silane groups are preferably dialkoxysilane groups and/or trialkoxysilane groups, in particular dimethoxymethylsilane groups or trimethoxysilane groups or triethoxysilane groups or diethoxymethylsilane groups.

The silane-functional polymer is preferably free from isocyanate groups.

On average the silane-function polymer has preferably 1.3 to 4, in particular 1.5 to 3, particularly preferably 1.7 to 2.8, silane groups per molecule.

The silane-functional polymer preferably has an average molecular weight in the range from 1000 to 30 000 g/mol, in particular from 2000 to 20 000 g/mol.

The silane-functional polymer is preferably liquid at room temperature. It particularly preferably has a low viscosity. The viscosity at 20° C. is in particular in the range from 1 to 200 Pa s, preferably 2 to 100 Pa s, particularly preferably 5 to 50 Pa s.

The silane-function polymer is preferably selected from the group consisting of silane-containing polyethers obtained from the reaction of allyl-containing polyethers with hydrosilanes, optionally with chain extension, in particular with diisocyanates;

silane-containing polyethers obtained from the copolymerization of alkylene oxides and epoxysilanes, optionally with chain extension, in particular with diisocyanates;

silane-containing polyethers obtained from the reaction of polyether polyols with isocyanatosilanes, optionally with chain extension with diisocyanates; and silane-containing polyethers obtained from the reaction of isocyanate-containing urethane polyethers with aminosilanes or hydroxysilanes or mercaptosilanes.

These silane-functional polymers are particularly readily obtainable.

Preferred among these are the silane-containing polyethers obtained from the reaction of allyl-containing polyethers with hydrosilanes. These silane-functional polymers have a particularly low viscosity and are particularly inert.

Also preferred among these are the silane-containing polyethers obtained from the reaction of polyether polyols with isocyanatosilanes. These silane-functional polymers are particularly readily obtainable, have a very low viscosity and are rather inert.

Also suitable are commercially available silane-functional polymers, in particular products available under the trade names MS Polymer™ (from Kaneka Corp.; especially types S203H, S303H, 5227, 5810, MA903 or S943); MS Polymer™ or Silyl™ (from Kaneka Corp.; especially types SAT010, SAT030, SAT200, SAX350, SAX400, SAX725, MAX450, MAX602 or MAX951); Excestar® (Asahi Glass Co. Ltd.; especially types 52410, 52420, 53430 or S3630); SPUR+® (from Momentive Performance Materials; especially types 101 OLM, 1015LM or 1050MM); Vorasil™ (from Dow Chemical Co.; especially types 602 or 604); Desmoseal® (from Bayer MaterialScience AG; especially the types S XP 2458, XP 2636, S XP 2749, S XP 2774 or S XP 2821); TEGOPAC® (from Evonik Industries AG; especially the types Seal 100, Bond 150 or Bond 250); or Geniosil® STP (from Wacker Chemie AG; especially types E15 or E35, E10 and E-30).

A silane-functional polymer obtained from the reaction of allyl-containing polyethers with hydrosilanes, optionally with chain extension with diisocyanates for example, in particular has structures of formula (III)

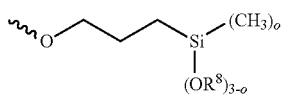

(III)

wherein
$R^8$ represents a methyl radical or an ethyl radical and
o represents 0 or 1 or 2.

It is preferable when o represents 0 or 1, in particular 1, and $R^8$ represents a methyl radical.

A silane-functional polymer obtained from the copolymerization of alkylene oxides and epoxy silanes, optionally with chain extension with diisocyanates for example, in particular has structures of formula (IV)

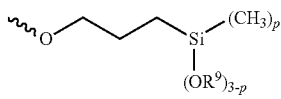

(IV)

wherein
$R^9$ represents a methyl radical or an ethyl radical and
p represents 0 or 1 or 2,
preferably 0.

In one embodiment of this polymer the polymer is a polyurethane obtainable by a process described hereinabove.

In one embodiment the viscosity of the polyurethane (plate-cone rotating viscometer, 23° C., ISO 3219:1994) is ≤115% of the viscosity of a comparative polyurethane produced by the same production process but with dibutyltin dilaurate in the same molar amount instead of the one or more cyclic tin compounds as described hereinabove in the catalyst component.

A further aspect of the invention is a process for producing a curable polymer, wherein the process comprises the step of contacting a polymer as described above with a siloxane condensation catalyst. Suitable siloxane condensation catalysts include in particular any desired non-organotin catalysts.

Particularly preferred catalysts for the crosslinking of silane-functional polymers are those comprising at least one amidino group. These are especially a compound of formula (V):

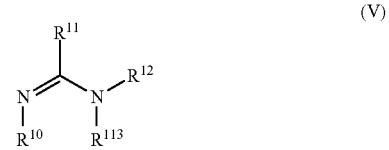

(V)

The radical $R^{10}$ represents a hydrogen atom, a monovalent hydrocarbon radical having 1 to 10 carbon atoms or, together with $R^{13}$, an optionally substituted, divalent hydrocarbon radical having 1 to 10 carbon atoms.

The radical $R^{11}$ represents a hydrogen atom, a monovalent hydrocarbon radical having 1 to 12 carbon atoms, optionally comprising cyclic or aromatic proportions and optionally comprising one or more heteroatoms, an amino group or, together with $R^{12}$, an optionally substituted, divalent hydrocarbon radical having 1 to 10 carbon atoms.

The radical $R^{12}$ represents a hydrogen atom, a monovalent hydrocarbon radical having 1 to 12 carbon atoms, optionally comprising cyclic or aromatic proportions and optionally comprising one or more heteroatoms or, together with $R^{11}$, an optionally substituted, divalent hydrocarbon radical having 1 to 10 carbon atoms.

The radical $R^{13}$ represents a hydrogen atom, a monovalent hydrocarbon radical having 1 to 10 carbon atoms or together with $R^{10}$ an optionally substituted, divalent hydrocarbon radical having 1 to 10 carbon atoms.

The radical $R^{11}$ and/or $R^{12}$ having heteroatoms is an alkyl radical having a silane group, such as for instance an alkyltrialkoxysilane radical.

The compound comprising at least one amidino group is preferably a guanidine, an imidazole, an imidazoline, a bicyclic amidine or a derivative of these compounds. Such derivatives are for example substituted imidazoles or imidazolines, especially a silane-comprising imidazole or imidazoline.

Preferred compounds having at least one amidino group are 1,8-diazabicyclo[5.4.0]undec-7-ene (DBU), 1,5-diazabicyclo[4.3.0]non-5-ene (DBN), 6-(dibutylamino)-1,8-diazabicyclo[5.4.0]undec-7-ene, N-methyltriazabicyclodecene, tetramethylguanidine, 2-guanidinobenzimidazole, acetylacetoneguanidine, 1,3-di-o-tolylguanidine (DTG), 1,3-diphenylguanidine, o-tolylbiguanidine, 2-tert-butyl-1,1,3,3-tetramethylguanidine or N-(3-triethoxysilylpropyl)-4,5-dihydroimidazole, N-(3-trimethoxysilylpropyl)-4,5-dihydroimidazole.

The proportion of the siloxane condensation catalyst is preferably 0.01% to 3% by weight, in particular 0.03% to 2% by weight, preferably 0.05% to 0.5% by weight, of the total composition. At proportions of more than 0.5% by weight sweating of the compound out of the cured composition may occur, which is disadvantageous for certain applications (visual appearance, easily soiled applications, etc).

It is preferable when the amidine is a bicyclic amidine, in particular having 9, 10, 11 or 12 carbon atoms in the bicyclic constituent. The advantage of these compounds is that they have a relatively high reactivity and the content thereof may therefore be kept relatively low. This in turn makes it possible to reduce the sweating of these compounds out of the cured composition.

Likewise suitable as siloxane condensation catalysts are amino-containing catalysts such as DABCO (1,4-diazabicyclo[2.2.2]octane).

Likewise suitable as siloxane condensation catalysts are monomeric amino-containing silanes.

In one embodiment of this process the polymer is further contacted with water.

The invention further relates to a curable polymer obtainable by an abovedescribed process according to the invention. The curable polymer is preferably a constituent of a curable formulation together with auxiliary and additive substances. It is for example employed in an amount of 10% to 80% by weight, in particular in an amount of 15% to 50% by weight, preferably 20% to 40% by weight, based on the total composition. Such a formulation may contain the following components, wherein the cyclic tin compound may originate from the reaction for producing the curable polymer:

a) between 10% by weight and 50% by weight of alkoxysilane-containing polymer;

b) cyclic tin compounds as described hereinabove between 0.001% by weight and % by weight;

c) between 0.001% by weight and 3% by weight of at least one catalyst for the crosslinking of silane-functional polymers, preferably selected from compounds containing neither tin or tin ions nor organotin compounds;

d) auxiliary and additive substances.

The following auxiliary and additive substances in particular are suitable:

Inorganic and organic fillers, in particular natural, ground or precipitated calcium carbonates, optionally coated with fatty acids, in particular stearic acid, barite, talc, quartz flours, quartz sand, dolomites, wollastonites, kaolins, calcined kaolins, mica, molecular sieves, aluminum oxides, aluminum hydroxides, magnesium hydroxide, silicas including highly disperse silicas from pyrolysis processes, industrially manufactured carbon black, graphite, metal powders such as aluminum, copper, iron, silver or steel, PVC powder or hollow spheres of inorganic or organic materials.

Adhesion promoters and/or crosslinking agents, in particular silanes such as in particular aminosilanes, such as in particular 3-aminopropyltrimethoxysilane, 3-aminopropyldimethoxymethylsilane, N-(2-aminoethyl)-3-aminopropyltrimethoxysilane, N-(2-aminoethyl)-3-aminopropylmethyldimethoxysilane, N-(2-aminoethyl)—N'-[3-(trimethoxysilyl)propyl]ethylenediamine or analogs thereof with ethoxy or isopropoxy groups instead of the methoxy groups on the silicon, N-phenyl-, N-cyclohexyl- or N-alkylaminosilanes, also mercaptosilanes, epoxysilanes, (meth)acryloylsilanes, anhydridosilanes, carbamatosilanes, alkylsilanes, vinylsilanes or iminosilanes, or oligomeric forms of these silanes or adducts of primary aminosilanes with epoxysilanes or (meth)acryloylsilanes or anhydridosilanes. 3-Glycidoxypropyltrimethoxysilane, 3-aminopropyltrimethoxysilane, N-(2-aminoethyl)-3-aminopropyltrimethoxysilane, N-(2-aminoethyl)—N'-[3-(trimethoxysilyl)propyl]ethylenediamine, 3-mercaptopropyltrimethoxysilane, 3-ureidopropyltriethoxysilane, vinyltrimethoxysilane or the corresponding silanes with ethoxy groups instead of the methoxy groups or oligomeric forms of these silanes are especially suitable.

Plasticizers, in particular carboxylic esters such as phthalates, in particular dioctyl phthalate, diisononyl phthalate or diisodecyl phthalate, adipates, in particular dioctyl adipate, azelates, sebacates, polyols, in particular polyoxyalkylene polyols or polyester polyols, glycol ethers, glycol esters, organic phosphoric or sulfonic acid esters, polybutenes or fatty acid methyl or ethyl esters derived from natural fats or oils, so-called "biodiesel", dialkyl 1,2-cyclohexanedicarboxylates such as diisononyl 1,2-cyclohexanedicarboxylate.

Optionally solvents.

Drying agents, in particular tetraethoxysilane, vinyltrimethoxysilane or vinyltriethoxysilane or organoalkoxysilanes having a functional group in a position to the silane group, in particular N-(methyldimethoxysilylmethyl)-O-methylcarbamate, (methacryloxymethyl)silanes, methoxymethylsilanes, orthoformate esters or calcium oxide or molecular sieves.

Stabilizers against oxidation, heat, light or UV radiation.

Pigments, especially titanium dioxide or iron oxides.

Rheology modifiers, especially thickeners, in particular phyllosilicates such as bentonites, derivatives of castor oil, hydrogenated castor oil, polyamides, polyurethanes, urea compounds, pyrogenic silicas, cellulose ethers or hydrophobically modified polyoxyethylenes.

Fibers, in particular glass fibers, carbon fibers, metal fibers, ceramic fibers or plastic fibers such as polyamide fibers or polyethylene fibers.

Dyes.

Natural resins, fats or oils such as colophony, shellac, linseed oil, castor oil or soybean oil.

Nonreactive polymers, such as in particular, homo- or copolymers of unsaturated monomers, in particular from the group comprising ethylene, propylene, butylene, isobutylene, isoprene, vinyl acetate or alkyl (meth)acrylates, in particular polyethylenes (PE), polypropylenes (PP), polyisobutylenes, ethylene vinyl acetate copolymers (EVA) or atactic poly-a-olefins (APAO).

Flame retardant substances, in particular the abovementioned fillers aluminum hydroxide or magnesium hydroxide, or in particular organic phosphoric esters such as in particular triethyl phosphate, tricresyl phosphate, triphenyl phosphate, diphenylcresyl phosphate, isodecyldiphenyl phosphate, tris(1,3-dichloro-2-propyl) phosphate, tris(2-chloroethyl) phosphate, tris(2-ethylhexyl) phosphate, tris(chloroisopropyl) phosphate, tris(chloropropyl) phosphate, isopropylated triphenyl phosphate, mono-, bis- or tris(isopropylphenyl) phosphates of different degrees of isopropylation, resorcinol bis(diphenyl phosphate), bisphenol-A-bis(diphenyl phosphate) or ammonium polyphosphates.

Surface-active substances, especially wetting agents, leveling agents, deaerating agents or defoamers.

Biocides, especially algicides, fungicides or substances that inhibit fungal growth.

Or further substances commonly employed in moisture-curable compositions.

It may be advantageous to dry certain constituents by chemical or physical means before incorporation into the composition.

In a preferred embodiment the composition is free of heavy metal-containing organic compounds. It is in particular free of organic tin compounds.

The composition is preferably produced and stored in the absence of moisture. The composition is typically storage stable in the absence of moisture in a suitable packaging or configuration, such as especially a drum, a bag or a cartridge.

The composition may be in the form of a one-component composition or in the form of a two-component composition.

In the present document "one-component" is to be understood as referring to a composition in which all constituents of the composition are stored mixed together in the same container and which is moisture-curable. In the present document "two-component" is to be understood as meaning a composition in which the constituents of the composition are in two different components which are stored in separate containers. Shortly before or during application of the composition the two components are mixed with one another to cure the mixed composition, wherein the curing is only effected or completed through the action of moisture.

During application of the composition on at least one object or article the silane groups present and any further moisture-reactive groups present come into contact with moisture, thus curing the composition. The curing occurs at different rates according to temperature, type of contact, the amount of moisture and the presence of any catalysts. In the case of curing by means of atmospheric humidity a skin is initially formed at the surface of the composition. The so-called skin forming time is a measure of the curing rate.

The term "curable" generally means in particular that the composition is capable of conversion from a relatively flexible, optionally plastically deformable state into a harder state under the influence of external conditions, in particular under the influence of moisture present in the environment and/or intentionally supplied. The crosslinking may generally be effected through chemical and/or physical influences in addition to the abovementioned moisture, i.e. for example also through supply of energy in the form of heat, light or other electromagnetic radiation but also through simple contacting of the composition with air or a reactive component.

A further aspect of the invention is a cured polymer obtainable by curing of a curable polymer described hereinabove.

In the cured state the polymer exhibits highly elastic properties, in particular a high strength and a high extensibility, and also good heat resistance and good adhesion properties on a very wide variety of substrates. This makes it suitable for a multiplicity of uses, in particular as a fiber composite material, potting compound, sealant, adhesive, covering, coating or paint for construction and industrial applications, for example as an electrical insulation compound, filler compound, joint sealant, welding or flanged seam sealant, parquet adhesive, assembly adhesive, autobody adhesive, window adhesive, sandwich element adhesive, floor covering, floor coating, balcony coating, roof coating, concrete protective coating, parking garage coating or as a protective coating against corrosion, as a sealant, paint, lacquer or primer. It is particularly suitable as an adhesive or sealant or coating, in particular for joint sealing or for elastic adhesive joins in construction or industrial applications.

In one embodiment of the cured polymer the cured polymer has at least one of the following properties compared to a comparative polymer, wherein the respective samples have been stored for 14 days at 23° C. and 50% relative humidity before measurement:

Shore A hardness (DIN 53505): ≤90% (preferably ≤85%, more preferably ≤80%) of the comparative polymer;

percentage value of elongation at break (DIN EN 53504, tensile speed: 200 mm/min, S2 test specimen): ≥101% (preferably ≥105%, more preferably ≥110%) of the percentage value for the comparative polymer;

secant modulus (EN ISO 8339, 100% elongation): ≤90% (preferably ≤85%, more preferably ≤80%) of the comparative polymer;

and wherein the comparative polymer was produced in the same way as the cured polymer but with dibutyltin dilaurate in the same molar amount instead of the one or more cyclic tin compounds as described hereinabove in the catalyst component in the process as described hereinabove.

The invention further relates to the use of a curable polymer as described hereinabove and/or of the cured polymer as described hereinabove as a sealant, adhesive or coating material.

For use as an adhesive or sealant, the curable polymer preferably has a pasty consistency with pseudoplastic properties. Such a pasty adhesive or sealant is applied to a substrate, optionally using an application robot, in particular from commercially available cartridges operated manually or using compressed air or from a drum or hobbock using a conveying pump or an extruder.

It is possible to bond or seal two identical or two different substrates. Suitable substrates are in particular:

glass, glass ceramic, screen printed ceramic, concrete, mortar, brick, tile, gypsum or natural stone such as granite or marble;

metals or alloys, such as aluminum, iron, steel or non-ferrous metals, or surface-coated metals or alloys, such as galvanized or chromed metals;

leather, textiles, paper, wood, with resins, for example phenolic, melamine or epoxy resins, bound wood-based materials, resin-textile composites or further so-called polymer composites;

plastics, in particular unplasticized or plasticized PVC, ABS, polycarbonate (PC), polyamide (PA), polyester, PMMA, epoxy resins, PUR, POM, PO, PE, PP, EPM or EPDM, wherein the plastics are optionally surface treated using plasma, corona or flame treatments;

fiber reinforced plastics, such as carbon fiber reinforced plastics (CFRP), glass fiber reinforced plastics (GFRP) or sheet molding compounds (SMC);

coated substrates, such as powder-coated metals or alloys;

paints or varnishes, especially automotive topcoats.

If desired the substrates may be pretreated before application of the adhesive or sealant, in particular through physical and/or chemical cleaning processes or application of an adhesion promoter, an adhesion promoter solution or a primer.

After the bonding or sealing of two substrates a glued or sealed article is obtained. Such an article may be a built structures, in particular a high-rise or low-rise built structures, or an industrial good or a consumer good, in particular a window, a household machine or a means of transport such as in particular an automobile, a bus, a heavy goods vehicle, a rail vehicle, a ship, an airplane or helicopter or an attachment thereof.

The moisture-curable composition preferably contains at least one further constituent selected from fillers, cross-linkers, plasticizers, solvents, catalysts, adhesion promoters, drying agents, stabilizers, pigments and rheology additives as described hereinabove. Said composition preferably has a content of silane-functional polymers in the range from 5% to 95% by weight, in particular in the range from 10% to 50% by weight.

The present invention is more particularly elucidated hereinbelow with reference to the examples without, however, being limited thereto.

Methods and Materials

Determination of shore hardness, elongation at break, tensile strength, tensile stress at 100% elongation and resilience:

After seven days of storage measured from production in a cartridge the moisture-curable compositions were applied to a polyethylene film using a doctor blade to afford membranes having a uniform layer thickness of 2 mm and cured for 14 days at 23° C. and 50% relative humidity, wherein after 7 days the membranes were detached from the film and turned over. The properties of the obtained membranes were subsequently determined by the following methods.

Testing of Shore A hardness was carried out on the membranes according to the specification in DIN ISO 7619-1. To determine Shore A hardness, three membranes were placed on top of one another to ensure a layer thickness of 6 mm.

Elongation at break, tensile strength and tensile stress at 100% elongation were determined by means of a tensile test according to the specification in DIN 53 504 on S2 dumbbells stamped from the membranes produced as described above using a shaped punch. The test speed was 200 mm/min.

Resilience was determined in accordance with ISO 7389 on aluminum test specimens (storage method B).

Viscosity was determined after seven or 60 days of storage and was carried out according to the specification in DIN EN ISO 3219/B3 at a shear rate of 40/s.

The skin forming time of the moisture-curable compositions was determined 7 d after production. Using a doctor blade (200 µm) a film of the adhesive is applied to a glass plate previously cleaned with ethyl acetate and is immediately placed in a drying recorder (BK 3 drying recorder BYK-Gardner). The needle is weighted with 10 g and moved over a distance of 35 cm over a period of 24 hours. The drying recorder was located in a climate controlled room at 23° C. and 50% rel. humidity. The time of disappearance of the permanent trace of the needle from the film was specified as the skin forming time.

The ambient temperature of 23° C. at the time of conducting the experiments is referred to as RT (room temperature).

7 d after production the through-curing of the moisture-curable compositions was determined in a Teflon mold with a wedge-shaped groove which was measured at its lowest point with a layer thickness meter and has a marking at the beginning of the depression. The sealant/adhesive was filled into the groove in excess and avoiding bubbles. The protruding sealant/adhesive was removed using a card or a Japanese spatula. Testing was performed in a climate controlled room under standard climatic conditions (23° C./50% relative atmospheric humidity). From the marking at the beginning of the depression the sealant/adhesive layer was carefully removed after 1 or 3 days until uncured material remained in the mold. This point was marked at the edge and the removed sealant/adhesive was placed in the mold again and lightly pressed into place. The distance between the marking at the beginning of the depression and this marking was measured with a ruler (corresponds to already cured length of the sealant/adhesive). Through-curing D is to be calculated according to the following equation: $D=(l \cdot d)/L$ with $l$=already cured length of the sealant/adhesive [mm], $L$=length of the groove [mm] and $d$=maximum depth of the groove [mm].

The tackiness of the 2 mm membrane after curing for 24 h was assessed by light finger pressure. It was assessed whether the film still had a tacky feel.

In the formulations of the curable composition the auxiliary and additive substances are defined as follows:

| Name | Description | Manufacturer |
|---|---|---|
| Mesamoll ® | plasticizer | Lanxess |
| Fibadur ® Schwarz 400724 | pigment paste | Fink |
| Tronox ® 8300 | pigment | Tronox Inc. |
| Cab-O-Sil ® TS 720 | rheology additive | Cabot Corporation |
| Socal ® U1S2 | filler | Imerys Carbonates |
| Dynasilan ® VTMO | desiccant | Evonik |
| Lupragen ® N700 | catalyst (DBU) | BASF SE |
| Tinuvin ® 292 | stabilizer | BASF SE |
| Tinuvin ® 1130 | stabilizer | BASF SE |
| Irganox ® 1135 | stabilizer | BASF SE |
| Dynasilan ® 1505 | adhesion promoter and/or crosslinker | Evonik |
| Dynasilan ® 1146 | adhesion promoter and/or crosslinker | Evonik |
| Omyalite ® 95T | calcium carbonate | Omya |

Production of Alkoxysilane-Containing Polyurethanes

Tin catalyst: The tin catalyst used according to the invention had the following structure:

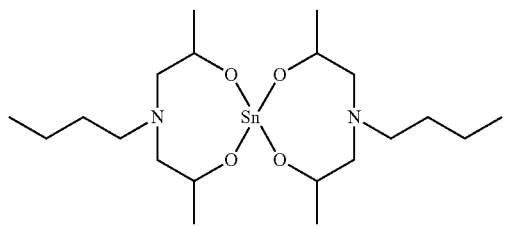 [SMILES: CCCCN1CC(C)[O][Sn]2([O]C(C)C1)[O]C(C)CN(CCCC)CC(C)[O]2]

EXAMPLE 1-1

Inventive 1174.0 g of a propylene glycol having an OH number of 13 (Acclaim® Polyol 8200 N of Covestro Germany AG; Leverkusen DE) were reacted with 147.2 g of Mesamoll® (Lanxess AG, Leverkusen, DE) and 63.5 g of isophorone diisocyanate at 60° C. with addition of the tin catalyst until the theoretical NCO content of 0.84% was achieved. Then 102.1 g of diethyl N-(3-trimethoxysilylpropyl) aspartate (produced according to EP-A 596 360, Example 5) were rapidly added dropwise and the mixture was stirred until the isocyanate band was no longer visible in the IR spectrum. The obtained polyurethane prepolymer comprising alkoxysilane end groups had a viscosity of 34 600 mPas. The usage amount of the tin catalyst was chosen such that the content of tin corresponded to 0.0036 percent by weight based on the obtained polyurethane prepolymer having alkoxysilyl end groups.

EXAMPLE 1-2

Comparative Example

The procedure described in example 1 was repeated with the exception that instead of the tin catalyst to be employed according to the invention 40 ppm of dibutyltin dilaurate were employed. The obtained polyurethane prepolymer comprising alkoxysilane end groups had a viscosity of 23 500 mPas.

EXAMPLE 1-3

Inventive 1461 g of Acclaim® 18200N (Covestro Germany AG, OH number 5.9 mg/kg) were dried in vacuo at 80° C. for six hours. After cooling to 60° C., 34.2 g of 3-isocyanatopropyltrimethoxysilane (Geniosil® GF40, Wacker AG, Burghausen) and the tin catalyst were added and the reaction was carried out at 60° C. until the theoretical NCO content of 0.05% was achieved. 0.5 g of methanol were then added to convert the excess NCO groups. The mixture was stirred until the isocyanate band was no longer visible in the IR spectrum. The obtained polyurethane prepolymer comprising alkoxysilane end groups had a viscosity of 35 500 mPas (23° C.). The usage amount of the tin catalyst was chosen such that the content of tin corresponded to 0.0023 percent by weight based on the obtained polyurethane prepolymer having alkoxysilyl end groups.

EXAMPLE 1-4

Comparative Example

The procedure described in example 3 was repeated with the exception that instead of the tin catalyst to be employed according to the invention 40 ppm of dibutyltin dilaurate were employed. The obtained polyurethane prepolymer comprising alkoxysilane end groups had a viscosity of 34 000 mPas.

Formulation of Moisture-Curable Compositions

The moisture-curable compositions were produced according to the following procedure: All of the components listed in Table 1 with the exception of the adhesion promoters were dispersed in a laboratory dissolver with a butterfly stirrer (200 revolutions/min) and a dissolver disk (2500 revolutions/min) for 15 min under static vacuum and cooling. Static vacuum is to be understood here as meaning that the apparatus is evacuated down to a pressure of 200 mbar (dynamic vacuum) and the connection to the vacuum pump is then severed. Cooling was chosen such that during entirety of production a temperature of 65° C. is not exceeded. The adhesion promoters were then added and the mixture was dispersed under a static vacuum for a further 10 min. The following data concerning the formulations are in parts by weight. *: Comparative example

TABLE 1

| | Example No. | | | |
|---|---|---|---|---|
| | 2-1 | 2-2* | 2-3 | 2-4* |
| Polymer from Example 1-1 | 457.56 | | 647.68 | |
| Polymer from Example 1-2 | | 457.56 | | 647.68 |
| Mesamoll ® | 436.5 | 436.5 | 223.52 | 223.52 |
| Fibadur ® Schwarz 400724 | 1.62 | 1.62 | | |
| Tronox ® 8300 | 49.32 | 49.32 | | |
| Cab-O-Sil TS 720 | 20.52 | 20.52 | 17.82 | 17.82 |
| Socal ® U1S2 | 761.76 | 761.76 | | |
| Omyalite ® 95T | | | 1224.74 | 1224.74 |
| Dynasilan ® VTMO | 26.82 | 26.82 | 49.72 | 49.72 |
| DBU | 1.26 | 1.26 | 2.64 | 2.64 |
| Tinuvin ® 292 | 10.26 | 10.26 | | |
| Tinuvin ® 1130 | 11.7 | 11.7 | | |
| Irganox ® 1135 | 6.12 | 6.12 | | |
| Dynasilan ® 1505 | 8.28 | 8.28 | | |
| Dynasilan ® 1146 | 8.28 | 8.28 | 33.88 | 33.88 |
| Total | 1800.00 | 1800.00 | 2200 | 2200 |

TABLE 2

| | Example No. | | | |
|---|---|---|---|---|
| | 2-1 | 2-2* | 2-3 | 2-4* |
| Skin formation time [min] | 45 | 30 | 40 | 25 |
| Tackiness 24 h | No | No | No | No |
| Through-curing D [mm] 1 d | 3.6 | 3.6 | 3.8 | 3.6 |
| Through-curing D [mm] 3 d | 5.9 | 5.3 | 4.7 | 4.5 |

It was found that the compositions according to the invention show comparable values for through-curing compared to those based on alkoxysilane-containing polyurethanes catalyzed with dibutyltin dilaurate. The skin forming time was in each case in the range of less than 60 min.

Membranes having a thickness of 2 mm were drawn from the formulations and subjected to mechanical examination.

TABLE 3

| | Example No. | | | |
|---|---|---|---|---|
| | 2-1 | 2-2* | 2-3 | 2-4* |
| Shore A after 14 d 23° C./50% rH | 32 | 41 | 13 | 23 |
| Tensile strength [MPa] | 3.0 | 2.9 | 3.5 | 2.7 |
| Elongation at break [%] | 703 | 579 | 997 | 725 |
| Secant modulus at 100% elongation [MPa] | 0.7 | 0.9 | 0.2 | 0.3 |

It was found that the cured compositions according to the invention achieve a significantly reduced secant modulus at 100% elongation compared to the respective comparative examples in which DBTL was used and this is particularly advantageous for use as a low-modulus construction sealant.

The invention claimed is:
1. A process for producing alkoxysilane-containing polyurethanes
   comprising the step of reacting
   a compound containing at least one NCO group with a compound containing at least one Zerewitinoff-active H atom in the presence of a catalyst component,
   wherein the compound containing at least one NCO group and/or the compound containing at least one Zerewitinoff-active H atom contain at least one alkoxysilane group,
to afford an alkoxysilane-containing polyurethane,
wherein
the reaction is at least periodically performed at a temperature of >50 ° C. and in that the catalyst component comprises one or more cyclic tin compounds selected from the group of mono- or polycyclic tin compounds of the type:
1,1-di-"R"-5-"organyl"-5-aza-2,8-dioxa-1-stannacyclooctanes,
1,1-di-"R"-5-(N-"organyl")aza-3,7-di-"organyl"-2,8-dioxa-1-stannacyclooctanes,
1,1-di-"R"-5-(N-"organyl")aza-3,3,7,7-tetra-"organyl"-2,8-dioxa-1-stannacyclooctanes,
4,12-di-"organyl"-1,7,9,15-tetraoxa-4,12-diaza-8-stannaspiro[7.7]pentadecanes,
4,12-di-"organyl"-2,6,10,14-tetra-"organyl"-1,7,9,15-tetraoxa-4,12-diaza-8- stannaspiro[7.7]pentadecanes,
4,12-di-"organyl"-2,2,6,6,10,10,14,14-octa-"organyl"-1,7,9,15-tetraoxa-4,12-diaza-8- stannaspiro[7.7]pentadecanes,
wherein "R" represents D *, L3 or L4 and "organyl" represents R1 as defined below:
R1 represents a saturated or unsaturated, linear or branched, aliphatic or cycloaliphatic radical or an optionally substituted aromatic or araliphatic radical which has up to 20 carbon atoms and may optionally contain heteroatoms from the group of oxygen, sulfur and nitrogen, or represents hydrogen or the radical

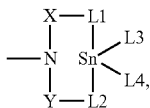

or R1 and L3 together represent —Z—L5—;
D* represents —O— or —S—;
X, Y and Z represent identical or different radicals selected from alkylene radicals of the formulae —C(R2)(R3)—, —C(R2)(R3)—C(R4)(R5)— or —C(R2)(R3)—C(R4)(R5)—C(R6)(R7)— or ortho-arylene radicals of the formulae

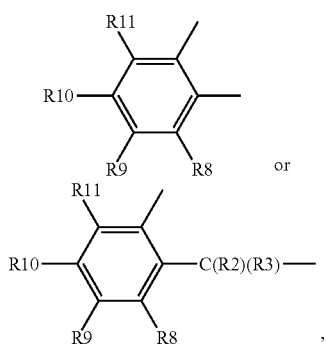

wherein R2 to R11 independently of one another represent saturated or unsaturated, linear or branched, aliphatic or cycloaliphatic or optionally substituted aromatic or araliphatic radicals which have up to 20 carbon atoms and may optionally contain heteroatoms from the group of oxygen, sulfur and nitrogen, or represent hydrogen;

L1, L2 and L5 independently of one another represent —O—, —S—, —OC (=O)—, —OC(=S)—, —SC (=O)—, —SC(=S)—, —OS(=O)$_2$O—, —OS(=O)$_2$— or —N(R12)—,
wherein R12 represents a saturated or unsaturated, linear or branched, aliphatic or cycloaliphatic radical or an optionally substituted aromatic or araliphatic radical which has up to 20 carbon atoms and may optionally contain heteroatoms from the group of oxygen, sulfur and nitrogen, or represents hydrogen;
L3 and L4 independently of one another represent —OH, —SH, —OR13, —Hal, —OC(=O)R14, —SR15, —OC(=S)R16, —OS(=O)$_2$OR17, —OS(=O)$_2$R18 or —NR19R20, or L3 and L4 together represent -L1—X—D—Y—L2—(D represents —O—, —S— or —N(R1)—),
wherein R13 to R20 independently of one another represent saturated or unsaturated, linear or branched, aliphatic or cycloaliphatic or optionally substituted aromatic or araliphatic radicals which have up to 20 carbon atoms and may optionally contain heteroatoms from the group of oxygen, sulfur and nitrogen, or represent hydrogen,
wherein the cyclic tin compound is one or more of the following compounds:
4,12-di-n-butyl-1,7,9,15-tetraoxa-4,12-diaza-8-stannaspiro[7.7]pentadecane,
4,12-di-n-butyl-2,6,10,14-tetramethyl-1,7,9,15-tetraoxa-4,12-diaza-8-stannaspiro[7.7]pentadecane,
2,4,6,10,12,14-hexamethyl-1,7,9,15-tetraoxa-4,12-diaza-8-stannaspiro[7.7]pentadecane,
4,12-di-n-octyl-2,6,10,14-tetramethyl-1,7,9,15-tetraoxa-4,12-diaza-8-stannaspiro[7.7]pentadecane,
4,12-di-n-octyl-1,7,9,15-tetraoxa-4,12-diaza-8-stannaspiro[7.7]pentadecane,
4,12-dimethyl-1,7,9,15-tetraoxa-4,12-diaza-8-stannaspiro[7.7]pentadecane or mixtures thereof.

2. The process as claimed in claim 1, wherein the reaction is at least periodically performed at a temperature of >50 ° C. for a period of >1 minute.

3. The process as claimed in claim 1, wherein the compound containing at least one NCO group contains at least one alkoxysilane group and in that the compound containing at least one Zerewitinoff-active H atom contains no alkoxysilane group.

4. The process as claimed in claim 1, wherein the compound containing at least one NCO group contains no alkoxysilane group and in that the compound containing at least one Zerewitinoff-active H atom contains at least alkoxysilane group.

5. The process as claimed in claim 4, wherein the compound containing at least one Zerewitinoff-active H atom contains at least one primary or secondary amino group.

6. An alkoxysilane-containing polymer, wherein the polymer comprises one or more cyclic tin compounds as described in claim 1.

7. The polymer as claimed in claim 6, wherein the polymer is a polyurethane obtained by a process as claimed in claim 1.

8. A process for producing a curable polymer, wherein the process comprises the step of contacting the polymer as claimed in claim 6 with a siloxane condensation catalyst.

9. The process as claimed in claim 8, wherein the polymer is further contacted with water.

10. A curable polymer, wherein the curable polymer is obtained by the process as claimed in claim 8.

11. A cured polymer, wherein the cured polymer is obtained by curing the curable polymer as claimed in claim 10.

12. The cured polymer as claimed in claim 11, wherein the cured polymer has at least one of the following properties compared to a comparative polymer, wherein the respective samples have been stored for 14 days at 23° C. and 50% relative humidity before measurement:
- Shore A hardness (DIN 53505): <90% of the comparative polymer;
- percentage value of elongation at break (DIN EN 53504, tensile speed: 200 mm/min, S2 test specimen): >101% of the percentage value of the comparative polymer;
- secant modulus (EN ISO 8339, 100% elongation): <90% of the comparative polymer;
- and wherein the comparative polymer was produced in the same way as the cured polymer but with dibutyltin dilaurate in the same molar amount instead of the one or more cyclic tin compounds.

13. A sealant, adhesive or coating material comprising the curable polymer as claimed in claim 10.

\* \* \* \* \*